(12) United States Patent
Conrad et al.

(10) Patent No.: US 11,156,390 B2
(45) Date of Patent: Oct. 26, 2021

(54) CRYOCOOLER WITH CONCENTRIC MOVING MECHANISMS

(71) Applicant: Raytheon Company, Waltham, MA (US)

(72) Inventors: Theodore J. Conrad, Redondo Beach, CA (US); Ryan Yates, Los Angeles, CA (US); Brian Schaefer, Huntington Beach, CA (US)

(73) Assignee: Raytheon Company, Waltham, MA (US)

( * ) Notice: Subject to any disclaimer, the term of this patent is extended or adjusted under 35 U.S.C. 154(b) by 104 days.

(21) Appl. No.: 16/026,620

(22) Filed: Jul. 3, 2018

(65) Prior Publication Data

US 2019/0003745 A1     Jan. 3, 2019

Related U.S. Application Data

(60) Provisional application No. 62/528,395, filed on Jul. 3, 2017.

(51) Int. Cl.
*F25B 9/14*     (2006.01)
*H02K 41/035*     (2006.01)
(Continued)

(52) U.S. Cl.
CPC ............... *F25B 9/145* (2013.01); *F25B 9/14* (2013.01); *H01F 7/06* (2013.01); *H01F 7/1646* (2013.01);
(Continued)

(58) Field of Classification Search
CPC ..... F25B 9/145; F25B 9/14; F25B 2309/1411
See application file for complete search history.

(56) References Cited

U.S. PATENT DOCUMENTS 4,389,849 A * 6/1983 Beggs .................. F02G 1/0435
310/15
5,412,951 A     5/1995 Wu
(Continued)

FOREIGN PATENT DOCUMENTS

JP     2016-163366 A     9/2016

OTHER PUBLICATIONS

International Search Report and Written Opinion of the International Searching Authority dated Oct. 18, 2018 in connection with International Patent Application No. PCT/US2018/040753, 13 pages.
(Continued)

*Primary Examiner* — Brian M King

(57) ABSTRACT

A cryogenic cooler includes a housing, and first, second, and third actuators. The first actuator includes at least one first voice coil and at least one first magnetic circuit, the at least one first voice coil of the first actuator configured to drive a compressor piston, the first actuator causing vibrations to the housing when driving the compressor piston. The second actuator includes at least one second voice coil and at least one second magnetic circuit, the at least one second voice coil of the second actuator configured to reduce the vibrations to the housing caused by driving the compressor piston. The third actuator includes at least one third voice coil and at least one third magnetic circuit, the third actuator configured to drive a displacer piston. The compressor piston, balance mechanism, and displacer piston are concentrically formed within the cryogenic cooler.

20 Claims, 7 Drawing Sheets

(51) Int. Cl.
*H01F 7/16* (2006.01)
*H01F 7/06* (2006.01)
*H02K 7/14* (2006.01)
*H02K 33/18* (2006.01)

(52) U.S. Cl.
CPC .............. *H02K 7/14* (2013.01); *H02K 33/18* (2013.01); *H02K 41/0356* (2013.01); *F25B 2309/001* (2013.01); *F25B 2309/1404* (2013.01); *F25B 2309/1411* (2013.01); *F25B 2500/13* (2013.01)

(56) References Cited

U.S. PATENT DOCUMENTS

| | | |
|---|---|---|
| 7,031,116 B2 | 4/2006 | Subrahmanyan |
| 9,281,735 B2 * | 3/2016 | Gandhi ................ H02K 41/033 |
| 9,551,513 B2 * | 1/2017 | Yates ..................... F25B 9/145 |
| 2001/0015068 A1 * | 8/2001 | Chung .................. F02G 1/0435 62/6 |
| 2008/0282706 A1 | 11/2008 | Hon et al. |
| 2015/0362221 A1 | 12/2015 | Yates et al. |
| 2016/0164446 A1 | 6/2016 | Conrad et al. |

OTHER PUBLICATIONS

Office Action dated Feb. 9, 2021 in connection with Japanese Patent Application No. 2020-520443, 9 pages.

* cited by examiner

CRYOCOOLER WITH CONCENTRIC MOVING MECHANISMS

CROSS-REFERENCE TO RELATED APPLICATIONS AND PRIORITY CLAIM

This application claims priority under 35 U.S.C. § 119(e) to U.S. Provisional Patent Application No. 62/528,395 filed on Jul. 3, 2017 entitled "CYROCOOLER WITH CONCENTRIC MOVING MECHANISMS", which is hereby incorporated by reference in its entirety.

TECHNICAL FIELD

This disclosure is generally directed to electromagnetic actuators. More specifically, this disclosure is directed to a cryocooler with concentric moving mechanisms.

BACKGROUND

Cryocoolers are often used to cool various components to extremely low temperatures. For example, cryocoolers can be used to cool focal plane arrays in different space and airborne imaging systems. There are various types of cryocoolers having differing designs, such as pulse tube cryocoolers and Stirling cryocoolers.

Pulse tube cryocoolers typically contain a compressor moving mechanism, while Stirling cryocoolers typically contain compressor, displacer, and balancer moving mechanisms. In both types of cryocoolers, these moving mechanisms are often dynamically balanced to minimize overall exported forces and torques (EFT). An inline cooler architecture reduces the number of mechanisms (one compressor as opposed to two) resulting in a reduction of overall size and mass of the cryocooler. This architecture requires two (pulse tube) or three (Stirling) independent mechanisms. Packaging these mechanisms compactly and with low mass is a challenge.

Pulse tube coolers eliminate displacer and balancer mechanisms to reduce size and mass, but also have higher EFT than actively balanced Stirling coolers. Some Stirling coolers also eliminate one compressor piston, resulting in an inherently unbalanced design, and then add a passive balancer if necessary to reduce EFT.

SUMMARY

This disclosure provides a cryocooler with concentric moving mechanisms.

In a first embodiment, a cryogenic cooler includes housing, and first and second actuators within the housing. The first actuator includes at least one first voice coil and at least one first magnetic circuit, the at least one first voice coil of the first actuator configured to drive a compressor piston, the first actuator causing vibrations to the housing when driving the compressor piston. The second actuator includes at least one second voice coil and at least one second magnetic circuit, the at least one second voice coil of the second actuator configured to reduce the vibrations to the housing caused by driving the compressor piston.

In a second embodiment, an apparatus includes housing, a compressor piston configured to compress a fluid, and a motor configured to drive the compressor piston. The motor includes at least one first voice coil and at least one first magnetic circuit, the at least one first voice coil of the motor configured to drive a compressor piston, the motor causing vibrations to the housing when driving the compressor piston. A balance actuator includes at least one second voice coil and at least one second magnetic circuit, the at least one second voice coil of the balance actuator configured to reduce the vibrations to the housing caused by driving the compressor piston.

In a third embodiment, a cooling method includes generating a first field of magnetic flux with a first magnetic circuit and generating a second field of magnetic flux with a second magnetic circuit. The method also includes compressing a fluid by selectively energizing a first voice coil, the first voice coil interacting with the first field of magnetic flux to drive a compressor piston to compress the fluid. The method also includes reducing vibrations, caused by the compression, by selectively energizing a second coil, the second coil interacting with the second field of magnetic flux to drive a balance mechanism to compensate for movement of the first coil or the first magnetic circuit. The compressor piston is formed concentrically around the balance mechanist.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

A cryocooler generally represents a device that can cool other components to cryogenic temperatures or other extremely low temperatures, such as to about 4 Kelvin, about 10 Kelvin, or about 20 Kelvin. A cryocooler typically operates by creating a flow of fluid (such as liquid or gas) back-and-forth within the cryocooler. Controlled expansion and contraction of the fluid creates a desired cooling of one or more components.

Figure 1:
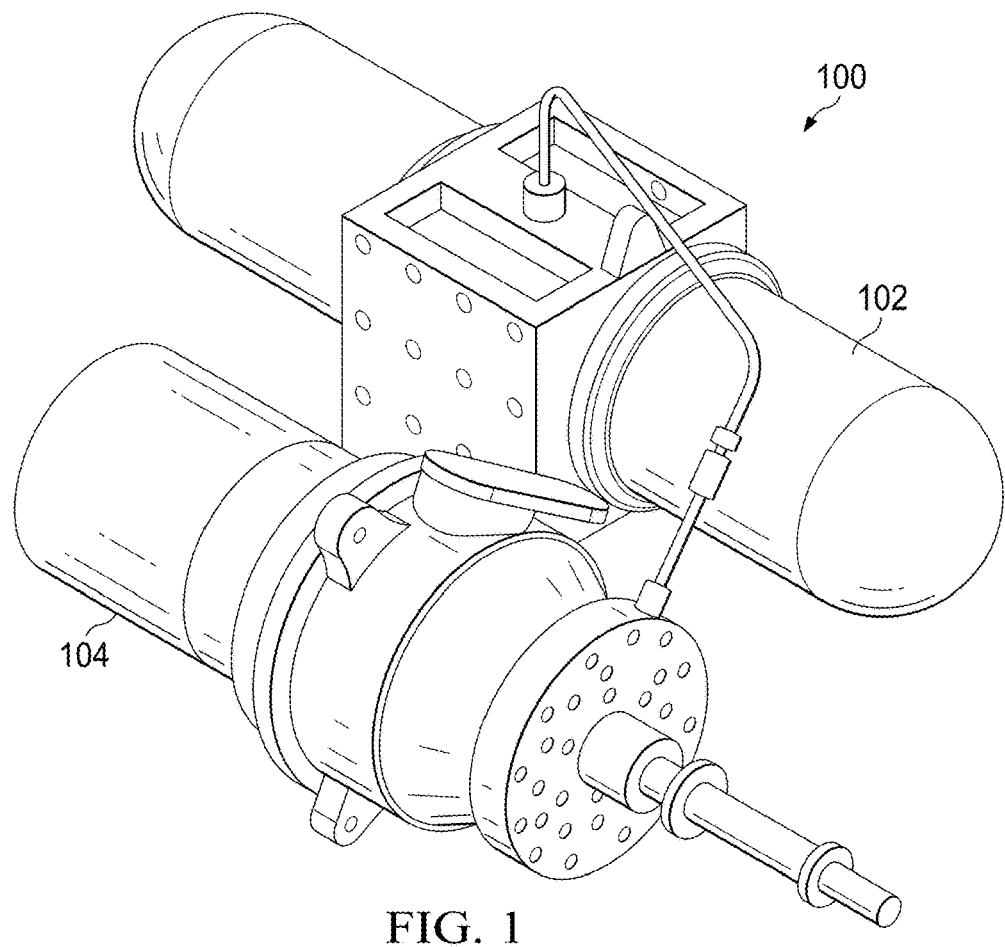
FIG. 1 illustrates a perspective view of a two-module Stirling cryocooler implemented according to this disclosure.

FIG. 1 illustrates a perspective view of a two-module Stirling cryocooler 100 implemented according to this disclosure. In FIG. 1, the Stirling cryocooler 100 includes two separate components, a compressor 102 and an expander 104. The compressor 102 contains one or more internal, linear motors that convert electrical power to flow work (often referred to as PV power) for use in the expansion/compression cooling cycle. Each motor is a coil that moves in response to the interaction of coil current and a flux generated by a magnetic circuit. The expansion/compression cooling cycle takes place in the expander 104. The expander 104 also contains dual-opposed motors. One of the two motors drives a Stirling displacer piston while the other motor is dedicated to balancing the displacer piston motor in order to minimize vibration.

Figure 2:
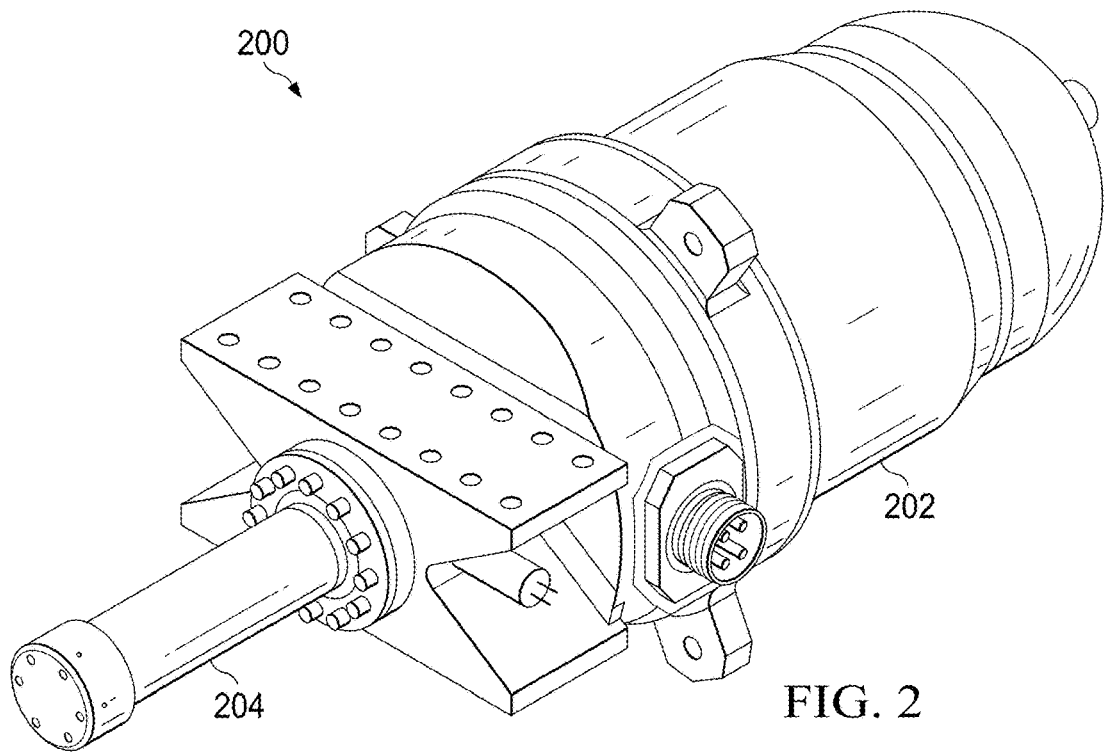
FIG. 2 illustrates a perspective view of a single-module pulse-tube cryocooler according to this disclosure.

FIG. 2 illustrates a perspective view of a single-module pulse-tube cryocooler 200 according to this disclosure. Pulse-tube cryocoolers can be built as either a single-module system or a two-module system as per the Stirling cryocooler. The compressor 202 of pulse-tube cryocooler 200 resembles that of the compressor 102 of the Stirling cryocooler 100. The expansion cycle in the pulse-tube cryocooler 200 is achieved through a purely passive expander 204 in the pulse-tube cryocooler 200.

One or more embodiments of this disclosure recognize and take into account that Stirling and pulse tube cryocoolers can contain dynamically balanced mechanisms for their compressor, displacer (if present), and balancer motors. These mechanisms add size and mass to the overall cryocooler system. An inline cooler configuration generally reduces the number of mechanisms by one (the second compressor piston) but still requires two or three independent mechanisms for a dynamically balanced design. Pulse tube cryocoolers eliminate displacer and generally balancer mechanisms as well, resulting in size and mass reduction but increased exported force and torque (EFT). Some tactical Stirling coolers also use a single piston compressor, which is not an inherently balanced mechanism, and incorporate an external passive balancer if needed to reduce the resulting EFT.

As described in more detail below, embodiments of this disclosure provide a motor architecture that includes up to three independent moving mechanisms in a coaxial arrangement with the balancer mechanism positioned concentric to the compressor and (if present) displacer mechanisms. The resulting motor assembly is significantly more compact than a corresponding architecture where all of the mechanisms are simply coaxial.

Figure 3:
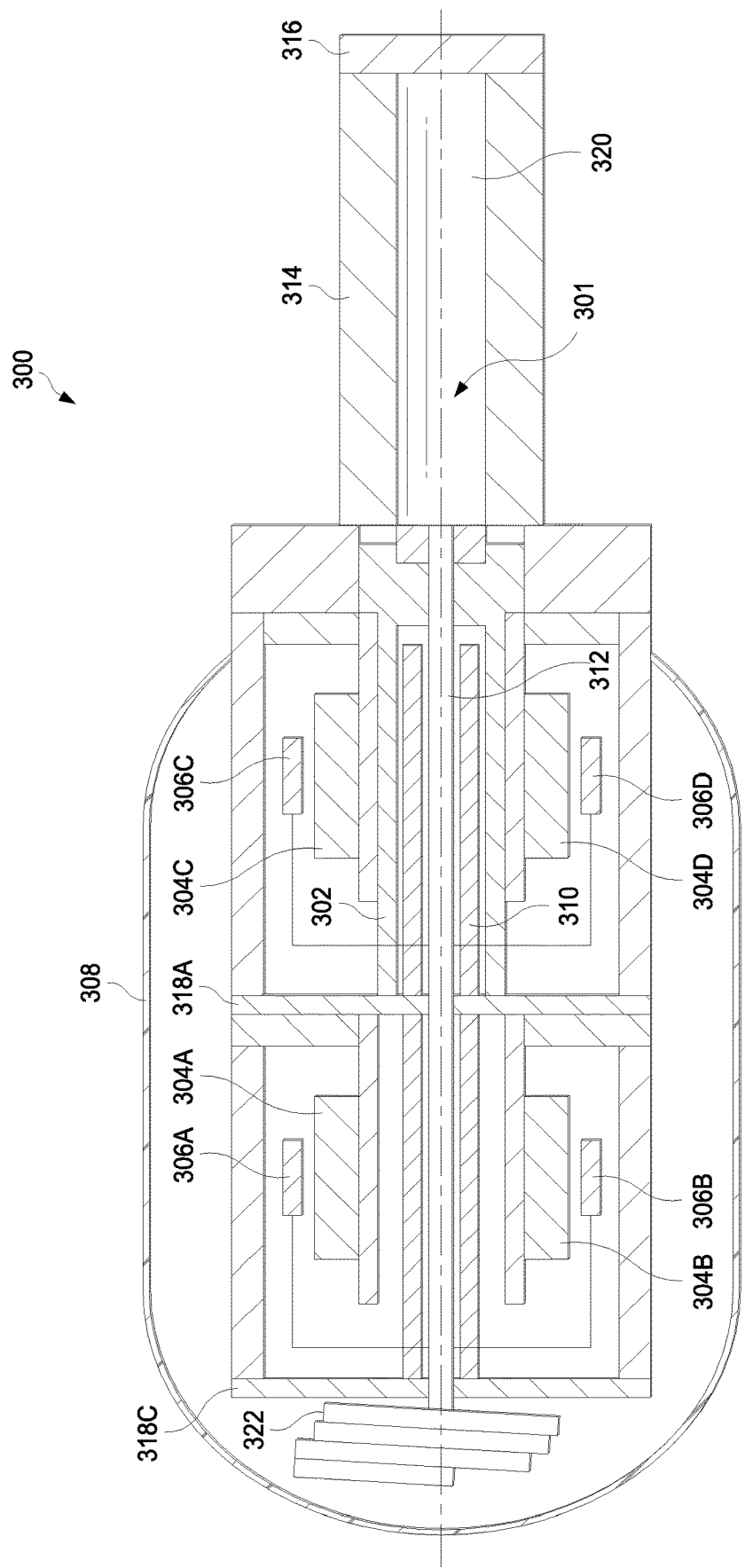
FIG. 3 illustrates a cross-sectional view of an example pulse cryocooler with two concentric moving mechanisms according to embodiments of this disclosure.

FIG. 3 illustrates a cross-sectional view of an example pulse cryocooler 300 with two concentric moving mechanisms according to embodiments of this disclosure. Cryocooler 300 can be one example of single-module pulse-tube cryocooler 200 as shown in FIG. 2.

As shown in FIG. 3, the cryocooler 300 includes an electromagnetic actuator having a piston 302 that moves, or strokes back-and-forth based on interactions between magnets 304C-D and voice coils 306C-D, which causes repeated pressure changes in a working fluid. In this example, the voice coils 306C-D are physically connected to the piston 302, while the magnets 304A-D are generally stationary (although the opposite arrangement could also be used). The piston 302 is moved within the cryocooler 300 by creating a varying magnetic field using the voice coils 306C-D, which interacts with the magnets 304C-D. The cryocooler 300 is positioned within a housing 308, which represents a support structure to or in which the cryocooler 300 is mounted. The housing 308 includes any suitable structure for encasing or otherwise protecting a cryocooler (or portion thereof).

In this embodiment, the compressor piston 302 is formed concentrically around balance mechanism 310 and inertance tube 312. Similarly, balance mechanism 310 is also formed concentrically around inertance tube 312. The radius of the balance mechanism 310 to center 301 is less than the radius of the compressor piston 302 to center 301. Each of the balance mechanism and compressor piston is concentrically formed around center 301 of cryocooler 300, which runs through the inertance tube 312 and pulse tube 320. In different embodiments, the components formed concentrically may be arranged in a different order. In further embodiments, other components, such as the magnets 304A-D or voice coils 306A-D may also be formed concentrically around the balance mechanism 310, compressor piston 302, and/or inertance tube 312.

The magnets 304C-D and voice coils 306C-D form a first voice coil actuator. This first voice coil actuator drives the piston 302. The piston 302 moves back-and-forth based on interactions between magnets 304C-D and voice coils 306C-D to drive flow fluid into the regenerator 314 and cool the cold end 316. The magnets 304A-B and voice coils 306A-B form a second voice coil actuator. The second voice coil actuator drives the balance mechanism 310 to absorb energy and reduce vibrations in the cryocooler 300. The piston 302 and the balance mechanism 310 can be mounted to the housing 308 by flexure suspensions 318A or C. The balance mechanism (or balancer mechanism) 310 can be driven to response with an equal or near equal force in an opposite direction to the compressor piston 302 to substantially cancel any potential vibrations. Pulse tube 320 communicates with reservoir 322 through inertance tube 312. Cold fluid passes between pulse tube 320 and regenerator 314.

Figure 4:
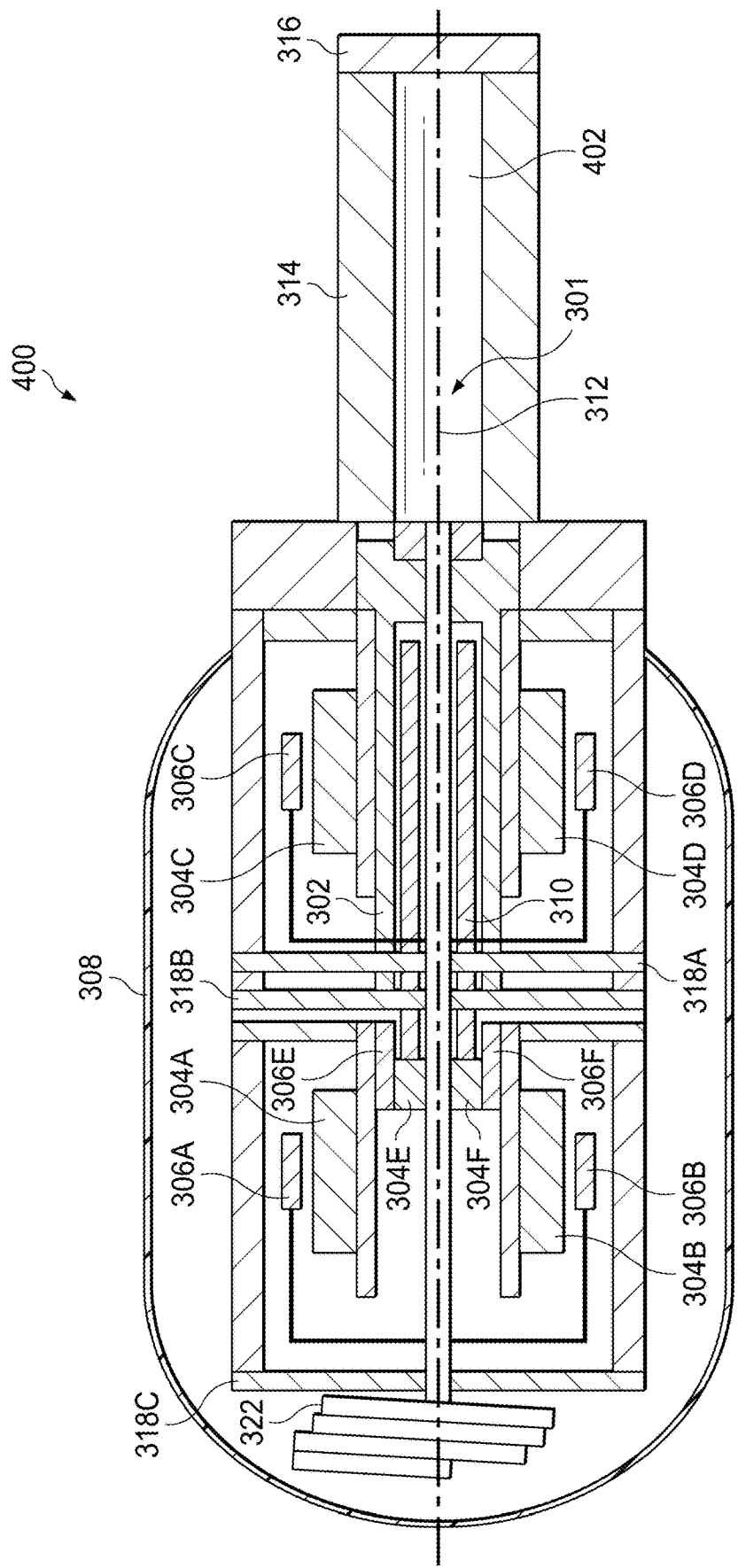
FIG. 4 illustrates a cross-sectional view of an example pulse cryocooler with three concentric moving mechanisms according to embodiments of this disclosure.

FIG. 4 illustrates a cross-sectional view of an example Stirling cryocooler 400 with three concentric moving mechanisms according to embodiments of this disclosure. Cryocooler 400 can be one example of single-module Stirling or pulse-tube cryocooler 200 as shown in FIG. 2.

The piston 302 is coupled to a Stirling displacer 402, which moves within a regenerator 314. A cold end 316 of the structure is cooled to cryogenic or other extremely low temperatures. As shown in FIG. 3, a center 301 of cryocooler 400 is through the Stirling displacer 402. As discussed herein, a radius of components within the cryocooler 400 can be derived by a measurement from the center 301 to the component. In FIG. 4, the three concentric moving mechanisms are the compressor piston and balance mechanism with the addition of the Stirling displacer 402 as compared to cryocooler 300 as shown in FIG. 3.

As shown in FIG. 4, the cryocooler 400 includes an electromagnetic actuator having a piston 302 that moves or strokes back-and-forth based on interactions between magnets 304C-D and voice coils 306C-D, which causes displacement of Stirling displacer 402. In this example, the voice coils 306C-D are physically connected to the piston 302, while the magnets 304A-D are generally stationary (although the opposite arrangement could also be used). The piston 302 is moved within the cryocooler 300 by creating a varying magnetic field using the voice coils 306C-D, which interacts with the magnets 304C-D. The cryocooler 300 is positioned within a housing 308, which represents a support structure to or in which the cryocooler 300 is mounted. The housing 308 includes any suitable structure for encasing or otherwise protecting a cryocooler (or portion thereof).

In this embodiment, the compressor piston 302 is formed concentrically around balance mechanism 310 and Stirling displacer 402. Similarly, balance mechanism 310 is also formed concentrically around Stirling displacer 402. The radius of the balance mechanism 310 to center 301 is less than the radius of the compressor piston 302 to center 301. Each of the balance mechanism 310 and compressor piston 302 is concentrically formed around center 301 of cryocooler 400, which runs through the center of Stirling displacer 402.

The magnets 304C-D and voice coils 306C-D form a first voice coil actuator. This first voice coil actuator drives the piston 302. The piston 302 moves back-and-forth based on interactions between magnets 304C-D and voice coils 306C-D to drive gas into the regenerator 314 and cool the cold end 316. The magnets 304E-F and voice coils 306E-F form a second voice coil actuator. The second voice coil actuator drives the balance mechanism 310 to absorb energy and reduce vibrations in the cryocooler 400. The piston 302 and the balance mechanism 310 can be mounted to the housing 308 by a flexure suspension 318A. Flexure suspensions 318B-C can mount the Stirling displacer 402 and balance mechanism 310. The magnets 304A-B and voice coils 306A-B form a third voice coil actuator. This third voice coil actuator drives the Stirling displacer 402.

In different embodiments, the components formed concentrically may be arranged in a different order. In further embodiments, other components, such as the magnets 304A-F or voice coils 306A-F may also be formed concentrically around the balance mechanism 310, compressor piston 302, and/or Stirling displacer 402.

Although FIGS. 3 and 4 illustrate examples of cryocooler components with two or three concentric moving mechanisms that utilize electromagnetic actuators, various changes may be made to FIGS. 3 and 4. For example, the specific implementations of the compressor and expansion assemblies shown here are for illustration only. Also, the techniques described below could be used with other components of a cryocooler that use electromagnetic actuators containing voice coils or with components of non-cryocooler-based systems that use electromagnetic actuators containing voice coils.

One or more embodiments of this disclosure provide a cryocooler motor incorporating two or three independent moving mechanisms. These moving mechanisms may be either moving coil or moving magnet type. The balancer mechanism is housed concentrically relative to the compressor and (if present) displacer mechanisms. This arrangement is compact, reducing overall cooler size and mass.

Figure 5:
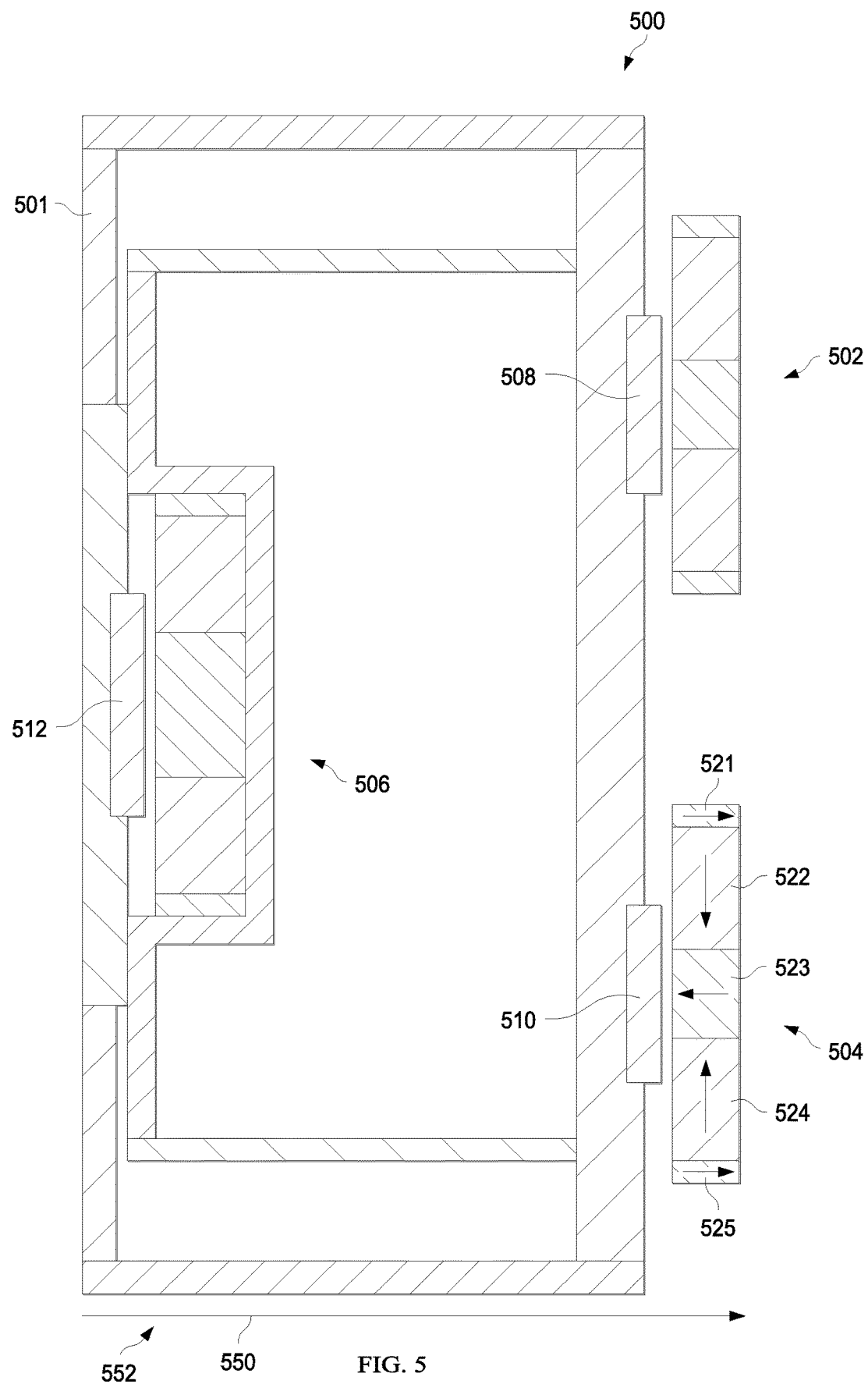
FIG. 5 illustrates a sectional side view of a cryocooler motor with moving magnetic circuits according to this disclosure.

FIG. 5 illustrates a sectional side view of a cryocooler motor with moving magnetic circuits according to this disclosure. The cryocooler motor could, for example, be used in cryocooler 200 of FIG. 2, or any other suitable component.

As shown in FIG. 5, the motor 500 includes a cylindrical housing 501 within which annular magnetic circuits 502, 504, and 506 and stationary coils 508, 510, and 512 are disposed. As mentioned above, the flux travels within a magnetic circuit and across an air gap to interact with a field generated by a flow of current in the voice coils 508, 510, and 512. In the illustrative embodiment, the magnetic circuit 502 is a low-power displacer magnetic circuit, the magnetic circuit 504 is a high-power primary (compressor) magnetic circuit, and the magnetic circuit 506 is a balancer magnetic circuit. The balancer magnetic circuit 506 can be sized to provide power and moving mass sufficient to compensate for the resultant force of the magnetic circuits 502 and 504.

The motor 500 can allow for independent movement of each of the magnetic circuits 502, 504, and 506 or voice coils 508, 510, and 512. For example, in this embodiment, each of the magnetic circuits 502, 504, and 506 is a moveable part of a mechanism that includes a coil and at least a portion of a magnetic circuit. The interaction of the fluxes of the magnetic circuits 502, 504, and 506 with the field generated by the coils 508, 510, and 512, respectively, induces a force that causes the magnetic circuits 502, 504, and 506 to move against different suspension elements of the cylindrical housing 501.

The coil 508 drives magnetic circuit 502, which transfers motion to a displacer piston. The displacer piston serves to displace gas compressed by a compressor piston, accomplishing a Stirling thermodynamic cycle. The coil 510 drives magnetic circuit 504, which transfers motion to a compressor piston disposed in a cylindrical chamber provided within the housing 501. The coil 512 drives magnetic circuit 506, which transfer motion to the housing 501 to reduce vibrations caused by the compressor and displacer pistons.

In FIG. 5, each of the magnetic circuits 502, 504, and 506 can include a plurality of magnetic elements. One or more embodiments of this disclosure recognize and take into account that minimizing exported forces and torques (EFT) of cryocoolers is often necessary to meet mission requirements. Active dynamic balancers are often used to cancel the forces generated by moving mechanisms and gas motions. These balancers can be heavy and bulky, adding to the mass and overall packaging dimensions of a cryocooler. The balancers may also require several watts of input power, a penalty which may be compounded by the lower efficiency of the linear amplifiers commonly used to drive the balancers. These balancer mechanisms require balance mass equivalent to the displacer mass to effectively balance the displacer mechanism. The mass of the stationary magnets in these moving coil designs is significant, as is the additional balancer mass required.

One or more embodiments of this disclosure provide a moving magnet circuit in which the magnetic elements are arranged as a Halbach array. A Halbach array is a particular arrangement of permanent magnets that augments the magnetic field on one side of the array while cancelling the field to near zero on the other side. This is achieved by having a spatially rotating pattern of magnetization. Arrangement in a Halbach array reduces the size/mass of magnets required to meet a given performance requirement (efficiency). The Halbach array also reduces the magnetic flux which escapes the mechanism, limiting radiated EMI from the motor.

In this example embodiment, each of the magnetic circuits 502, 504, and 506 includes magnetic elements arranged in a Halbach array. For convenience, only the components of the magnetic circuit 504 are identified using reference numbers. The magnetic circuit 504 includes magnetic elements 521-525. In the magnetic circuit 504, the magnetic elements 521 and 525 are magnetized in the same direction, while the magnetic elements 522 and 524 are magnetized in opposite directions as well as at a ninety degree angle to the magnetic elements 521 and 525. The magnetic element 523 is magnetized in an opposite direction to magnetic elements 521 and 525. In other embodiments, the magnetized pattern of the magnetic circuit 504 may be different to allow for augmentation of the magnetic field in a desired side. Here, the augmentation occurs in a direction of the coil 510.

As shown in FIG. 5, arrow 550 illustrates a direction away from a center of the housing 501. Because FIG. 5 illustrates a sectional side view of cryocooler motor 500, the center 552 of the housing 501 is to the left of the housing. As shown here, magnetic circuits 502 and 504 share a radius to the center 552, and magnetic circuit 506 has a smaller radius to the center 552 of the housing 501. As discussed herein, a radius of components within the housing 501 can be derived by a measurement from the center 552 to the component.

Although FIG. 5 illustrates an example of a cryocooler motor with three independent mechanisms, various changes may be made to FIG. 5. For example, the specific implementations of the magnetic circuits and voice coils shown here are for illustration only. In different embodiments, more or fewer magnetic circuits and/or voice coils may be used.

Figure 6:
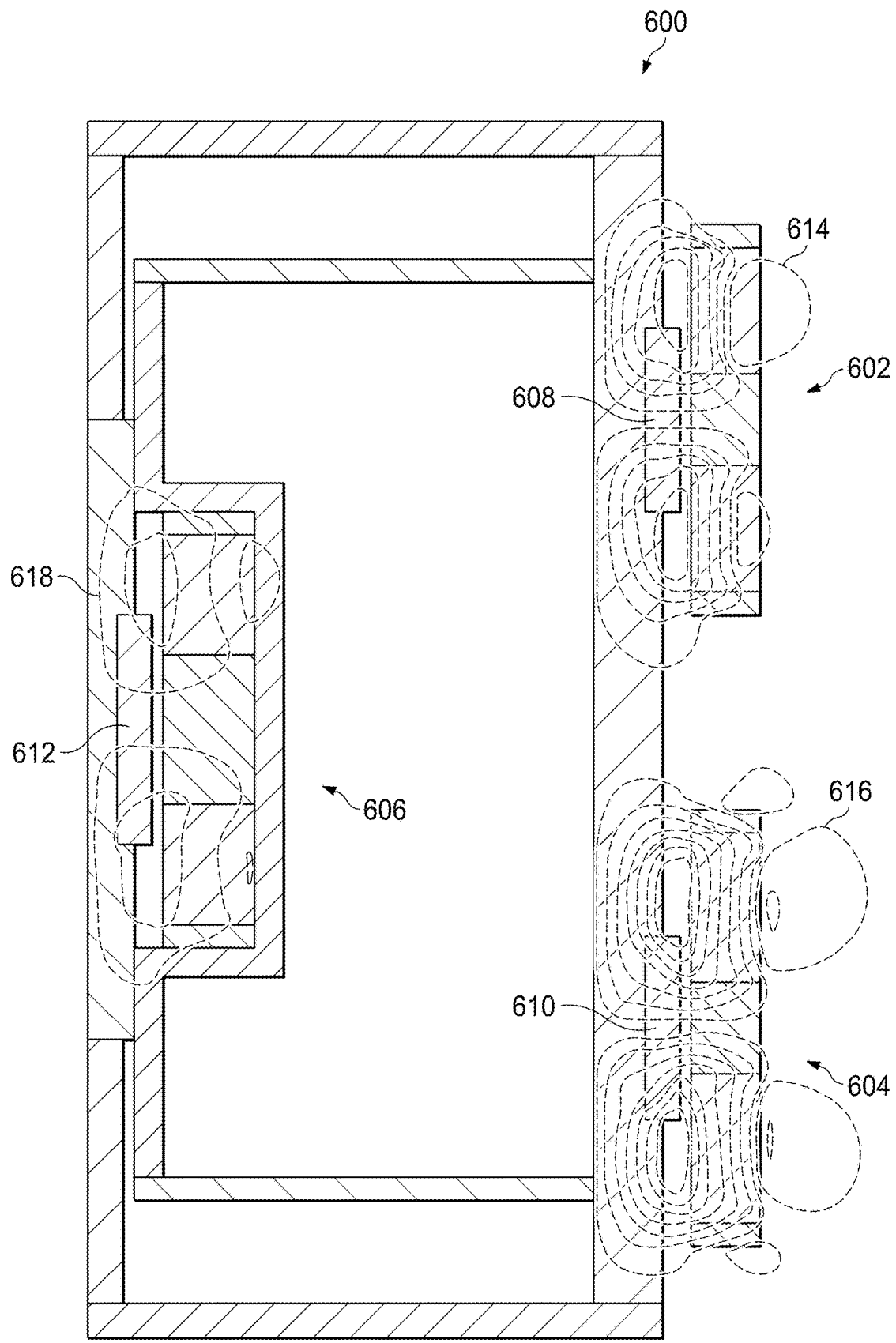
FIG. 6 illustrates a sectional side view of a cryocooler motor with a depiction of visible magnetic fields according to this disclosure.

FIG. 6 illustrates a sectional side view of a cryocooler motor 600 with a depiction of visible magnetic fields according to this disclosure. The cryocooler motor 600 could, for example, could be one example of the cryocooler motor 500 as shown in FIG. 5.

The cryocooler motor 600 includes magnetic circuits 602, 604, and 606 and voice coils 608, 610, and 612. As shown in FIG. 6, the magnetic fields 614, 616, and 618 of the magnetic circuits 602, 604, and 606 are augmented toward the voice coils 608, 610, and 612, respectively. The augmentation of the magnetic fields 614, 616, and 618 is due to the Halbach array arrangement of each of the magnetic circuits 602, 604, and 606.

Although FIG. 6 illustrates an example of a cryocooler motor with a depiction of visible magnetic fields, various changes may be made to FIG. 6. For example, the specific implementations of the magnetic circuits are for illustration only. In different embodiments, different orientations and patterns can be used within each magnetic circuit to product a different effect of the magnetic fields.

Figure 7:
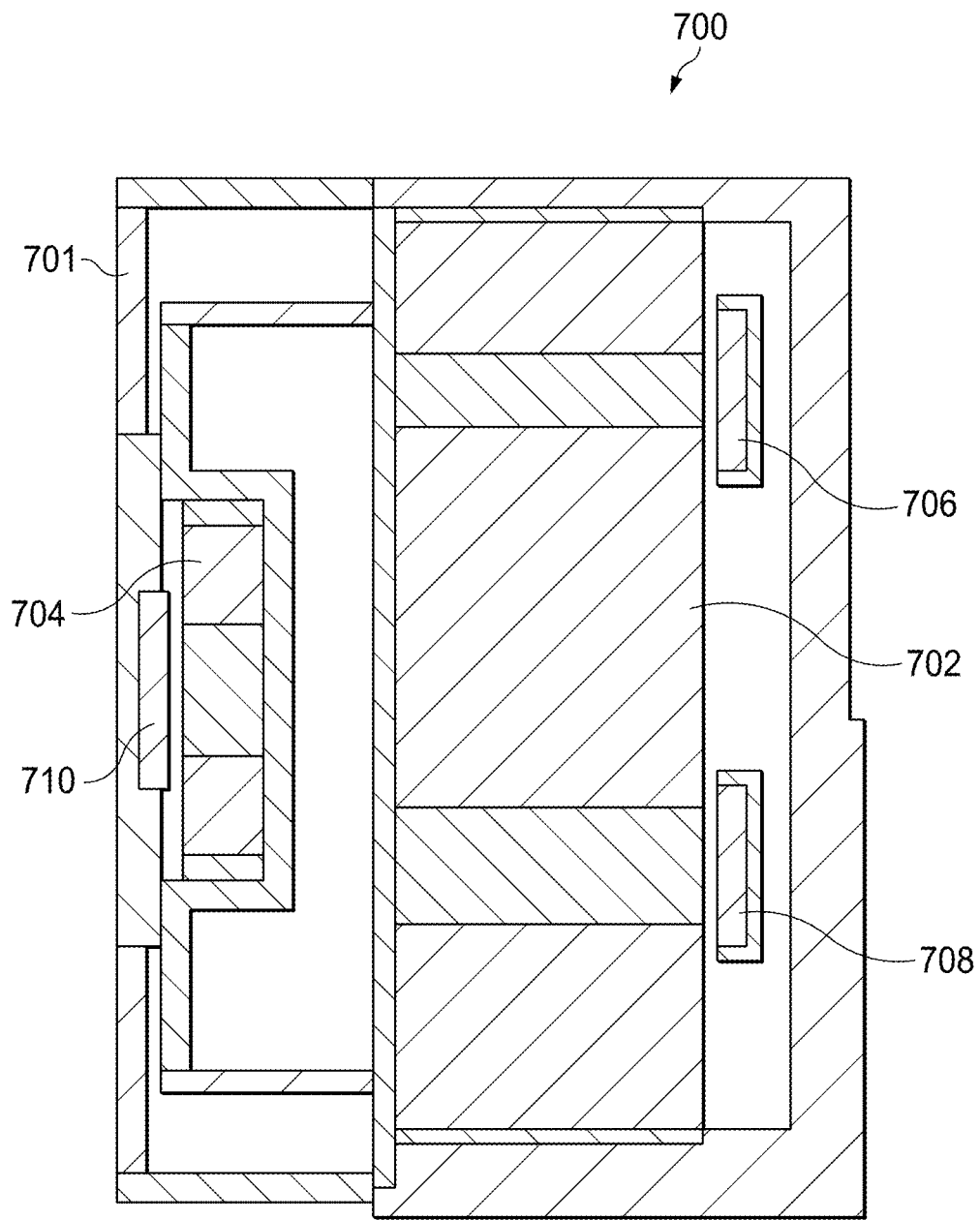
FIG. 7 illustrates a sectional side view of a cryocooler motor with moving voice coils according to this disclosure.

FIG. 7 illustrates a sectional side view of a cryocooler motor 700 with moving voice coils according to this disclosure. The cryocooler motor 700 could, for example, be used be used in cryocooler 200 of FIG. 2, or any other suitable component.

As shown in FIG. 7, the motor 700 includes a cylindrical housing 701 within which annular magnetic circuits 702 and 704 and voice coils 706, 708, and 710 are disposed. A flux travels within each magnetic circuit 702 and 704 and across an air gap to interact with an electric field generated by a flow of current in the voice coils 706, 708, and stationary coil 710. In the illustrative embodiment, the voice coil 706 is a low-power displacer coil, the coil 708 is a high-power primary (compressor) coil, and the coil 710 is a balancer coil. The balancer coil 710 can be sized to provide power and moving mass sufficient to compensate for the resultant force of the coils 706 and 708.

The motor 700 allows for independent movement of each of the voice coils 706-708. For example, in this embodiment, each of the voice coils 706-708 is a moveable part of a mechanism that includes a voice coil and at least a portion of a magnetic circuit. The interaction of the fluxes of the magnetic circuits 702 and 704 with the field generated by the coils 706, 708, and 710 induces a force that causes the coils 706, 708, and magnet 704 to move against different suspension elements or the cylindrical housing 701.

The magnetic circuit 702 drives the voice coils 706 and 708, which transfer motion to compressor and displacer pistons. The magnetic circuit 704 is driven by coil 710, which transfers force to the housing 701 to reduce vibrations caused by the compressor and displacer pistons. In this example embodiment, each of magnetic circuits 702 and 704 includes magnetic elements arranged in a Halbach array. The voice coils 706 and 708 can share a common magnetic circuit as depicted herein, or can each be associated with a different magnetic circuit.

Although FIG. 7 illustrates an example of a cryocooler motor with moving voice coils, various changes may be made to FIG. 7. For example, the specific implementations of the magnetic circuits and voice coils shown here are for illustration only. In different embodiments, more or fewer magnetic circuits and/or voice coils may be used.

Figure 8:
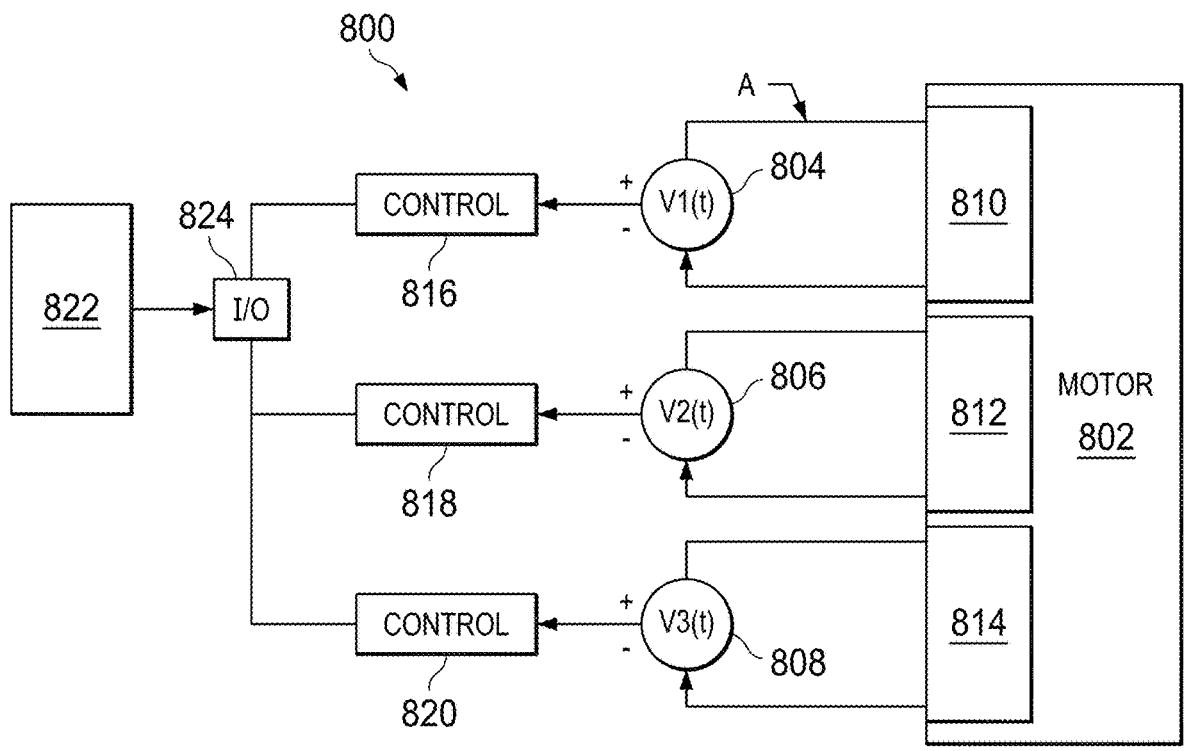
FIG. 8 illustrates a single-module Stirling cycle cryocooler having a cryocooler motor with three independently driven magnetic coils according to this disclosure.

FIG. 8 illustrates a single-module Stirling cycle cryocooler 800 having a cryocooler motor 802 with three independently driven magnetic coils according to this disclosure. Cryocooler 800 can be one example of the cryocoolers as shown in FIGS. 1-7. As shown in FIG. 8, the cryocooler 800 includes first, second, and third variable power sources 804, 806, and 808, respectively, that drive the first, second, and third coils 810, 812, and 814, respectively, in response to signals from first, second, and third controllers 816, 818, and 820, respectively. The first, second, and third controllers 816, 818, and 820 are responsive to user input or a processor 822 input via an input/output interface 824.

For example, using the cryocooler 800 in reference to the cryocooler motor 500 as shown in FIG. 5, the cryocooler 800 can compress a fluid by selectively energizing a first voice coil 504 (810). The first voice coil 504 (810) interacts with the first field of magnetic flux to drive a compressor piston to compress the fluid. The cryocooler can expand the fluid by selectively energizing a second voice coil 502 (812). The second voice coil 502 (812) interacts with the first field of magnetic flux of the first magnetic circuit or a second field of magnetic flux of a second magnetic circuit to drive a displacer piston to expand the fluid. The cryocooler can reduce vibrations caused by the compression by selectively energizing a third voice coil 506 (814). The third voice coil 506 (814) interacts with the third field of magnetic flux to compensate for movement of the first voice coil 504 (810) or the first magnetic circuit and the second voice coil 502 (812) or the second magnetic circuit.

Although FIG. 8 illustrates an example of a single-module Stirling cycle cryocooler with three independently driven magnetic coils, various changes may be made to FIG. 8. For example, the specific implementations of the magnetic circuits and voice coils shown here are for illustration only. In different embodiments, more or less voice coils may be used.

Figure 9:
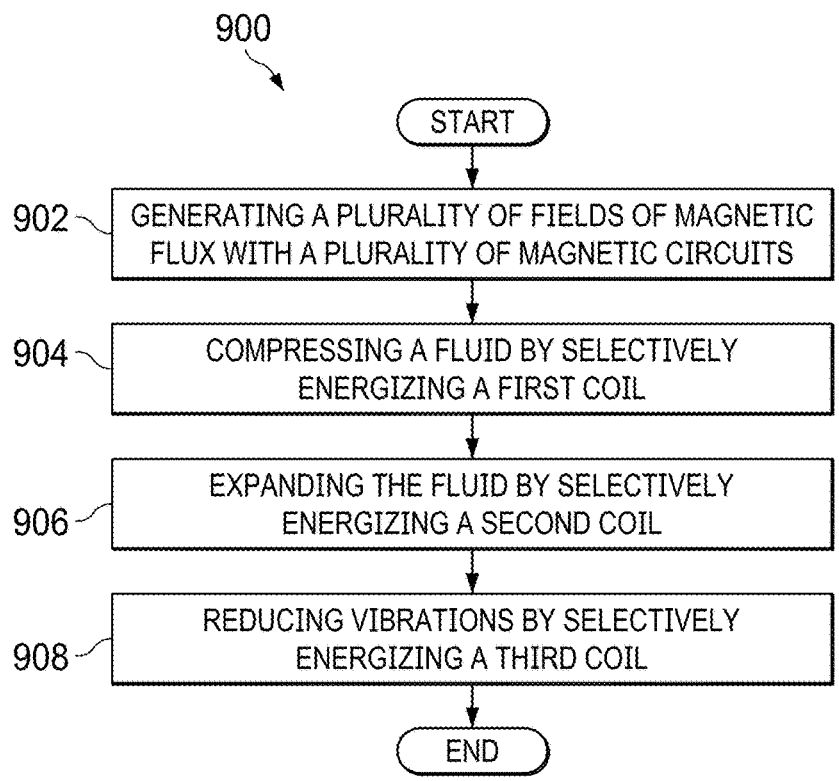
FIG. 9 illustrates a process for cooling according to this disclosure.

FIG. 9 illustrates a process 900 for cooling according to this disclosure. The process can be implemented by one of the cryocoolers or cryocooler components as illustrated in FIGS. 1-8.

At step 902, a cryocooler generates a plurality of fields of magnetic flux with a plurality of magnetic circuits. For example, the cryocooler can generate a first field of magnetic flux with a first magnetic circuit, generate a second field of magnetic flux with a second magnetic circuit, and generate a third field of magnetic flux with a third magnetic circuit. In different embodiments, more or fewer fields of magnetic flux may be generated.

At step 904, the cryocooler can compress a fluid by selectively energizing a first voice coil. The first voice coil interacts with the first field of magnetic flux to drive a compressor piston to compress the fluid.

At step 906, the cryocooler can expand the fluid by selectively energizing a second voice coil. The second voice coil interacts with the first field of magnetic flux of the first magnetic circuit or a second field of magnetic flux of a second magnetic circuit to drive a displacer piston to expand the fluid.

At step 908, the cryocooler can reduce vibrations caused by the compression by selectively energizing a third voice coil. The third voice coil interacts with the third field of magnetic flux to compensate for movement of the first voice coil or the first magnetic circuit and the second voice coil or the second magnetic circuit. In one or more embodiments, the third voice coil or the third magnetic circuit is concentrically mounted with respect to the first voice coil or the first magnetic circuit. The first magnetic circuit is mounted for mechanically independent movement relative to the second and third magnetic circuits. In another embodiment, the first voice coil is mounted for mechanically independent movement relative to the second and third voice coils.

Although FIG. 9 illustrates one example of a process 900 for cooling, various changes may be made to FIG. 9. For example, while shown as a series of steps, various steps shown in FIG. 9 could overlap, occur in parallel, occur in a different order, or occur multiple times. Moreover, some steps could be combined or removed and additional steps could be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A cryogenic cooler comprising:
    a housing;
    a first actuator within the housing, the first actuator including at least one first voice coil and at least one first magnetic circuit, the at least one first voice coil of the first actuator configured to drive a compressor piston, the first actuator configured to cause vibrations to the housing when driving the compressor piston; and
    a second actuator within the housing, the second actuator including at least one second voice coil and at least one second magnetic circuit, the at least one second voice coil of the second actuator configured to drive a balance mechanism to reduce the vibrations to the housing caused by driving the compressor piston;
    wherein the compressor piston is concentrically positioned around at least a portion of the balance mechanism such that at least a portion of the compressor piston surrounds at least a portion of the balance mechanism.

2. The cryogenic cooler of claim 1, wherein the at least one second voice coil of the second actuator is mounted for mechanically independent movement relative to the at least one first voice coil of the first actuator.

3. The cryogenic cooler of claim 1, further comprising:
    a third actuator within the housing, the third actuator including at least one third voice coil and at least one third magnetic circuit, the third actuator configured to drive a displacer piston,
    wherein the at least one third voice coil of the third actuator is mounted for mechanically independent movement relative to the first and second voice coils of the first and second actuators.

4. The cryogenic cooler of claim 1, wherein the compressor piston and the balance mechanism are concentric to a center of the housing.

5. The cryogenic cooler of claim 3, wherein one or more of the at least one first, at least one second, or at least one third magnetic circuit includes a plurality of magnetic elements arranged in a Halbach array.

6. The cryogenic cooler of claim 4, further comprising:
    a displacer piston that is concentric to the center of the housing.

7. The cryogenic cooler of claim 6, wherein the balance mechanism is concentrically positioned around at least a portion of the displacer piston.

8. The cryogenic cooler of claim 1, wherein the compressor piston and the balance mechanism are concentric to a center of the housing, and wherein the balance mechanism is concentrically positioned around at least a portion of an inertance tube.

9. An apparatus, comprising:
    a housing;
    a compressor piston configured to compress a fluid;
    a motor configured to drive the compressor piston, the motor including at least one first voice coil and at least one first magnetic circuit, the at least one first voice coil of the motor configured to drive the compressor piston, the motor configured to cause vibrations to the housing when driving the compressor piston; and
    a balance actuator including at least one second voice coil and at least one second magnetic circuit, the at least one second voice coil of the balance actuator configured to drive a balance mechanism to reduce the vibrations to the housing caused by driving the compressor piston;
    wherein the compressor piston is concentrically positioned around at least a portion of the balance mechanism such that at least a portion of the compressor piston surrounds at least a portion of the balance mechanism.

10. The apparatus of claim 9, wherein the at least one second voice coil of the balance actuator is mounted for mechanically independent movement relative to the at least one first voice coil of the motor.

11. The apparatus of claim 9, further comprising:
    a displacer piston configured to expand the fluid; and
    a displacer actuator including at least one third voice coil and at least one third magnetic circuit, the displacer actuator configured to drive the displacer piston,
    wherein the at least one third voice coil of the displacer actuator is mounted for mechanically independent movement relative to the first and second voice coils of the motor and the balance actuator.

12. The apparatus of claim 9, wherein the compressor piston and the balance mechanism are concentric to a center of the housing.

13. The apparatus of claim 12, further comprising:
    a displacer piston that is concentric to the center of the housing.

14. The apparatus of claim 13, wherein the balance mechanism is concentrically positioned around at least a portion of the displacer piston.

15. The apparatus of claim 9, wherein the compressor piston and the balance mechanism are concentric to a center of the housing, and wherein the balance mechanism is concentrically positioned around at least a portion of an inertance tube.

16. A cooling method comprising:
generating a first field of magnetic flux with a first magnetic circuit and generating a second field of magnetic flux with a second magnetic circuit;
compressing a fluid by selectively energizing a first voice coil, the first voice coil interacting with the first field of magnetic flux to drive a compressor piston to compress the fluid; and
reducing vibrations, caused by the compression, by selectively energizing a second voice coil, the second voice coil interacting with the second field of magnetic flux to drive a balance mechanism to compensate for movement of the first voice coil or the first magnetic circuit, wherein the compressor piston is concentrically positioned around at least a portion of the balance mechanism such that at least a portion of the compressor piston surrounds at least a portion of the balance mechanism.

17. The cooling method of claim 16, wherein the second voice coil is mounted for mechanically independent movement relative to the first voice coil.

18. The cooling method of claim 16, wherein the compressor piston and the balance mechanism are concentric to each other.

19. The cooling method of claim 16, wherein at least one of the first magnetic circuit or the second magnetic circuit includes a plurality of magnetic elements arranged in a Halbach array.

20. The cooling method of claim 16, further comprising:
driving a displacer piston using a third voice coil and a third magnetic circuit.

* * * * *